US010798928B2

(12) United States Patent
Hyun

(10) Patent No.: US 10,798,928 B2
(45) Date of Patent: Oct. 13, 2020

(54) BAIT CASTING REEL

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/424,829

(22) Filed: May 29, 2019

(65) Prior Publication Data

US 2019/0364865 A1 Dec. 5, 2019

(30) Foreign Application Priority Data

May 31, 2018 (KR) .................. 10-2018-0062920

(51) Int. Cl.
*A01K 89/01* (2006.01)
*A01K 89/015* (2006.01)
*A01K 89/033* (2006.01)

(52) U.S. Cl.
CPC ...... *A01K 89/01931* (2015.05); *A01K 89/033* (2013.01)

(58) Field of Classification Search
CPC ........ A01K 89/01555; A01K 89/01931; A01K 89/058; A01K 89/059
See application file for complete search history.

(56) References Cited

U.S. PATENT DOCUMENTS

| 2,361,239 | A | * | 10/1944 | Ransom | ........... | A01K 89/01555 242/288 |
| 4,549,703 | A | * | 10/1985 | Atobe | .............. | A01K 89/01555 242/288 |
| 4,618,106 | A | * | 10/1986 | Noda | ............... | A01K 89/01555 242/290 |
| 5,692,693 | A | * | 12/1997 | Yamaguchi | ...... | A01K 89/01555 242/288 |
| 5,855,331 | A | * | 1/1999 | Morimoto | .......... | A01K 89/0186 242/310 |
| 6,086,005 | A | * | 7/2000 | Kobayashi | ....... | A01K 89/01555 188/182 |
| 6,412,722 | B1 | * | 7/2002 | Kreuser | ........... | A01K 89/01555 242/288 |
| 2002/0063181 | A1 | * | 5/2002 | Yamaguchi | ........ | A01K 89/0155 242/286 |

(Continued)

FOREIGN PATENT DOCUMENTS

JP     4354848      10/2009

*Primary Examiner* — Emmanuel M Marcelo
(74) *Attorney, Agent, or Firm* — Cantor Colburn LLP

(57) ABSTRACT

Provided is a bait casting reel for preventing friction or break of a spool plate and a braking magnet due to contact by deformation of a rotary shaft of a spool or a friction washer, etc., by employing a variable spool plate coupled to be able to move left and right in the longitudinal direction of a spool shaft so that a user can easily and freely adjust a braking force after setting a maximum braking force of a braking magnet without replacing or changing parts, and by enabling a user to perform zero adjustment such that the spool plate and the braking magnet is minimally spaced to set a maximum braking force of the braking magnet by moving the spool plate and the braking magnet in contact with each other when the spool plate is moved the outermost side.

2 Claims, 13 Drawing Sheets

(56) References Cited

U.S. PATENT DOCUMENTS

| | | | | |
|---|---|---|---|---|
| 2004/0227029 | A1* | 11/2004 | Ikuta | A01K 89/01555 242/288 |
| 2006/0169813 | A1* | 8/2006 | Nakagawa | A01K 89/01555 242/288 |
| 2009/0026300 | A1* | 1/2009 | Tsutsumi | A01K 89/01555 242/288 |
| 2009/0127367 | A1* | 5/2009 | Tsutsumi | A01K 89/01555 242/286 |
| 2015/0014460 | A1* | 1/2015 | Hyun | A01K 89/0155 242/289 |
| 2016/0037759 | A1* | 2/2016 | Ikebukuro | A01K 89/01555 242/288 |
| 2016/0235048 | A1* | 8/2016 | Ikebukuro | A01K 89/045 |
| 2017/0172131 | A1* | 6/2017 | Toake | A01K 89/045 |
| 2017/0208785 | A1* | 7/2017 | Ishikawa | A01K 89/01555 |

* cited by examiner

BAIT CASTING REEL

BACKGROUND OF THE INVENTION

Field of the Invention

The present invention relates to a bait casting reel characterized by preventing friction or breaking of a spool plate and a braking magnet due to contact by deformation of a rotary shaft of a spool or a friction washer, etc., by employing a variable spool plate disposed to be able to move left and right in the longitudinal direction of a spool shaft so that a user can easily and freely adjust a braking force after setting a maximum braking force of a braking magnet without replacing or changing parts, and by enabling a user to perform zero adjustment such that the spool plate and the braking magnet is minimally spaced to set a maximum braking force of the braking magnet by moving the spool plate and the braking magnet in contact with each other or closest to each other when the spool plate is moved the outermost side.

Description of the Related Art

In general, when casting with a bait casting reel for fishing, the rotational speed of a spool from which a fishing line is released is larger than a flying speed of a lure, so the flying distance of the lure is short or the fishing line is entangled, which is called a backlash phenomenon.

In order to prevent this backlash phenomenon, a bait casting reel largely employs a friction brake that uses physical friction and a magnet brake that uses attraction of magnetism.

As for the friction brake, the maximum torque is generated in the early stage of casting, the torque is gradually reduced by friction that is generated by a brake shoe coming in direct contact with a brake pad by a centrifugal force, etc., and accordingly, the rotational speed of a spool decreases and a rotational braking force of the friction brake decreases. The friction brake is advantageous in long-distance casting more than the magnet brake, but has a problem that it is difficult to finely control the braking force, and wear is easily generated and noise is increased due to the friction between the brake shoe and the brake pad.

The magnet brake for solving this problem, which is a non-contact type brake unlike the friction brake, reduces the rotational speed of a spool by applying attraction of magnetism to the rotating spool using the magnetism of a plurality of magnets disposed on a reel body.

Most bait casting reels equipped with such a magnet brake enable a user to adjust the braking force by freely adjusting the gap between the braking magnet and the spool.

That is, when the braking magnet is closest to the spool, the magnetic force that is applied to the spool increases, so the braking force becomes the maximum. When the braking magnet is spaced farthest from the spool, the magnetic force that is applied to the spool decreases, so the braking force becomes the minimum.

A part that is disposed on a reel body to adjust the gap between a braking magnet and a spool is called a braking dial.

In this case, it is required to move the braking magnet closest to the spool without the braking magnet and the spool coming in contact with each other in order to set the braking force of the braking magnet to the maximum.

However, when parts of a bait casting reel is deformed, etc., the braking magnet and the spool come in contact with each other, so the parts are easily worn and broken. Accordingly, in order to prevent this breakage, all kinds of bait casting reels that are currently released are manufactured in a type in which the gap between a braking magnet and a spool is larger than the original distance that provides the maximum braking force of a braking magnet.

In other words, a spool lock that is an assistant part for preventing deformation of a spool or the shaft of the spool, or a backlash phenomenon due to tension of a fishing line when the filing line has been wound on the spool is used to apply load to rotation of the spool.

Accordingly, when a friction washer etc. supporting a spool shaft is deformed in casting, the gap between the braking magnet and the spool decreases, so they can come in contact with each other.

Accordingly, bait casting reels in the related art have been released with the gap between a braking magnet and a spool relatively increased in consideration of such deformation of parts.

Therefore, it is impossible to use a braking magnet at the closest distance to a spool despite the advantage of the magnet brake. Further, as the maximum braking force decreases, the structure of a bait casting reel is complicated, for example, because it is required to increase the number of braking magnets or add other assistant parts to appropriately brake a spool.

Further, since bait casting reels of the related art are released with a predetermined gap between a braking magnet and a spool, a user cannot freely adjust the maximum braking force of the braking magnet and cannot manually tune an optimum braking force, depending on the state change of a bait casting reel when using the bait casting reel.

SUMMARY OF THE INVENTION

The present invention has been made in an effort to solve these problems and an object of the present invention is to provide a bait casting reel in which a spool plate to which the magnetic force of a braking magnet is applied can be moved in the longitudinal direction of a spool shaft so that a user can freely set and adjust the maximum braking force of the braking magnet when using a bait casting reel equipped with the braking magnet.

Another object of the present invention is to provide a bait casting reel in which a variable spool plate is moved in a thread-fastening type or a cam-driving type so that users can conveniently control a braking force by finely and step by step adjusting movement of the spool plate.

In order to achieve the objects, a bait casting reel according to the present invention includes: a spool disposed on a reel body with a shaft therethrough and having a body on which a fishing line is wound and which has an opening on a side, and a shaft portion that protrudes to a side from the opening of the body and in which a spool shaft is fitted; a variable spool plate disposed to be able to move left and right in the opening of the body in a longitudinal direction of the shaft portion; a braking magnet disposed inside a spool cover of the reel body and providing a braking force for reducing a rotational speed of the spool using a magnetic force that is applied to the spool plate; and a braking force adjuster coupling the spool plate such that the spool plate can move left and right on the shaft portion, and adjusting the braking force of the braking magnet by adjusting a distance between the spool plate and the braking magnet, in which when the spool plate is moved to an outermost side, the spool plate and the braking magnet come in contact with each other or move closest to each other, so a user can perform zero adjustment such that the spool plate and the braking magnet are minimally spaced in order to set a maximum braking force.

The braking adjuster may include a spool plate thread-fastened to an outer side of the shaft portion and moving left and right with rotation.

The braking adjuster may include: a spool plate fitted on the outer side of a shaft portion by sliding to move left and right; and a plate dial thread-fastened to an outer side of the spool shaft in contact with a side of the spool plate to move left and right with rotation.

The braking adjuster may include: a first spool cam coupled and fixed to an outer side of the shaft portion and having a first cam portion connected to have a circumferential height difference; and a first plate cam connected with the spool plate, rotataby coupled to the shaft portion, having a second cam portion formed in a shape corresponding to the first cam portion in contact with the first cam portion, and moving left and right with rotation.

The first cam portion and the second cam portion may be connected in step type.

The first cam portion and the second cam portion may respectively have a fitting groove and a fitting protrusion that are male-female coupled on contact surfaces.

The braking adjuster may include: a cam dial coupled to be rotatable on the spool shaft and having a third cam portion connected to have a height difference in a circumferential direction; and a spool plate coupled to be movable left and right on the shaft portion, having a fourth cam portion, which has a shape corresponding to the third cam portion and is in surface contact with the third cam portion, and moving left and right with rotation of the cam dial.

The braking adjuster may include: a stopper pin coupled through the spool shaft in a front-rear direction; and a second spool cam connected with the spool plate, coupled to be able to rotate and move left and right on the shaft portion, having a height difference in a circumferential direction, having slots, in which both ends of the stopper pin are fitted, and moving left and right with rotation.

According to the bait casting reel of the present invention, a variable spool plate that can be moved left and right in the longitudinal direction of a spool shaft is provided, and when the spool plate is moved to the outermost side, the spool plate and the braking magnet are moved in contact with each other or closest to each other, so a user can perform zero adjustment by spacing the spool plate and the braking magnet with a minimum gap to set the maximum braking force of the braking magnet, thereby being able to use the bait casting reel with the braking force maximally maintained using the braking magnet.

In particular, when the braking force is changed due to wear, deformation, etc. of reel parts in use, a user can easily perform zero adjustment, so it is possible to maintain and manage the bait casting reel in an optimum state.

Further, a user can set an optimum braking force suitable for the state of the reel or himself/herself in person.

Further, a user can adjust the braking force finely or step by step in accordance with convenience in use.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
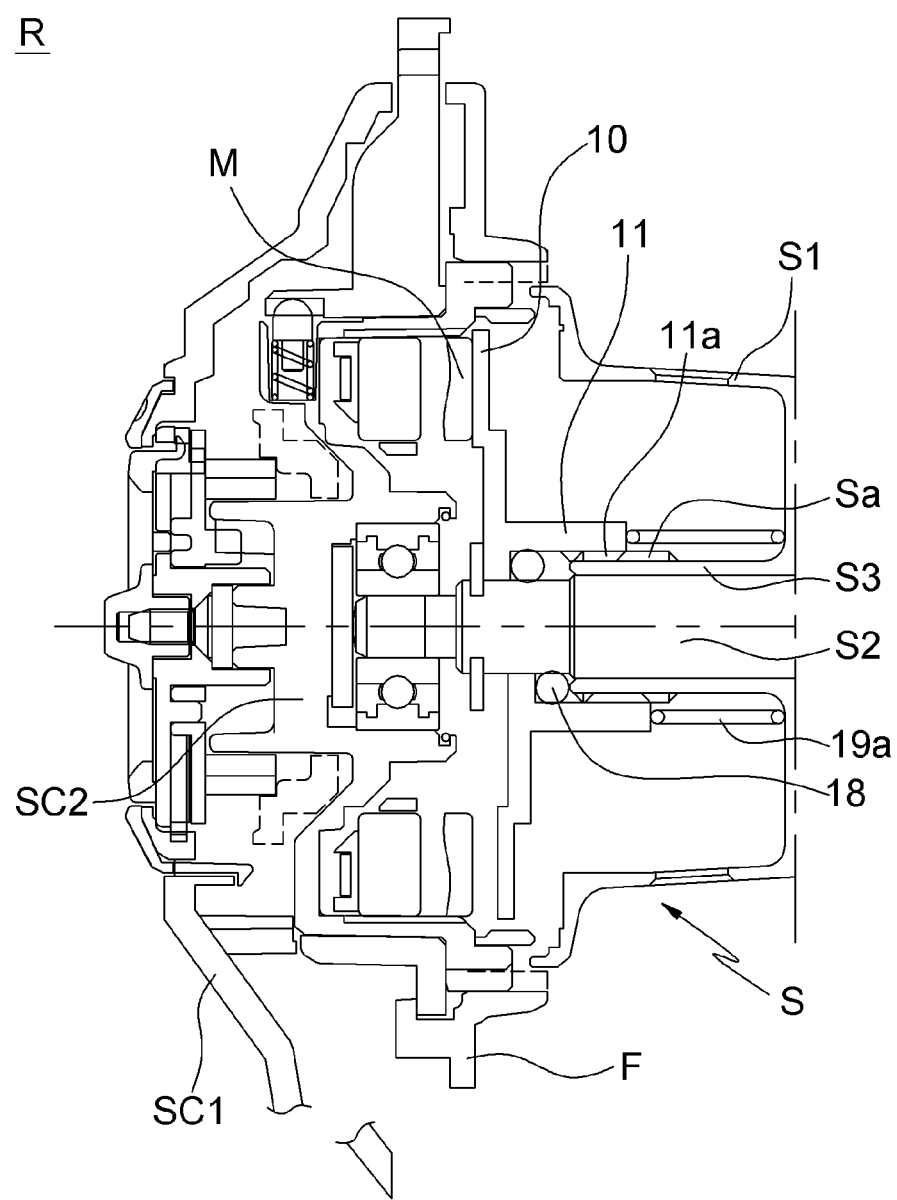
FIGS. 1 to 5 are cross-sectional views showing main parts of a first embodiment of the present invention.

The present invention may be modified in various ways and implemented by various exemplary embodiments, so that aspects (or embodiments) will be described in detail. However, it is to be understood that the present invention is not limited to the specific exemplary embodiments, but includes all modifications, equivalents, and substitutions included in the spirit and the scope of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood on the basis of this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. Singular forms are intended to include plural forms unless the context clearly indicates otherwise.

It will be further understood that the terms "comprises" or "composed of" used in this specification, specify the presence of stated features, steps, operations, components, parts, or a combination thereof, but do not preclude the presence or addition of one or more other features, numerals, steps, operations, components, parts, or a combination thereof.

Unless defined otherwise, it is to be understood that all the terms used in the specification including technical and scientific terms has the same meaning as those that are understood by those who skilled in the art. It will be further understood that terms used herein should be interpreted as having a meaning that is consistent with their meaning in the context of this specification and the relevant art and will not be interpreted in an idealized or overly formal sense unless expressly so defined herein.

Terms such as 'a first~' and 'a second~' are used only for the purpose for distinguishing a constitutive element from other constitutive element, but constitutive element should not be limited to a manufacturing order, and the terms described in the detailed description of the invention may not be consistent with those described in the claims.

For convenience of the description of a bait casting reel according to the present invention, when an approximate direction rather than a precise direction is specified with reference to FIG. 1, the upper side is determined as the front, and left and right directions are determined on the basis of the upper side. This standard may be also applied to the other drawings, and directions may be specified and described based on this standard unless the detailed description of the invention and the claims specially indicate otherwise.

Hereafter, a bait casting reel having a variable spool plate according to the present invention is described with reference to the accompanying drawings.

As shown in FIGS. 1 to 13, a bait casting reel according to the present invention includes:

a spool S disposed on a reel body R with a shaft therethrough and having a body S1 on which a fishing line is wound and which has an opening on a side, and a shaft portion S3 that protrudes to a side from the opening of the body S1 and in which a spool shaft S2 is fitted;

a variable spool plate 10 disposed to be able to move left and right in the opening of the body S1 in the longitudinal direction of the shaft portion S3;

a braking magnet M disposed inside a spool cover SC2 of the reel body R and providing a braking force for reducing a rotational speed of the spool S using a magnetic force that is applied to the spool plate 10; and a braking force adjuster coupling the spool plate 10 such that the spool plate 10 can move left and right on the shaft portion S3, and adjusting the braking force of the braking magnet M by adjusting the distance between the spool plate 10 and the braking magnet M.

When the spool plate 10 is moved to the outermost side, the spool plate 10 and the braking magnet M come in contact with each other or move closest to each other, so a user can perform zero adjustment such that the spool plate 10 and the braking magnet M are minimally spaced in order to set a maximum braking force.

The reel body R includes a palm-side first side cover SC1 and a gear-side second side cover (not shown) respectively coupled to both sides of a frame F having a spool mount, in which the first side cover SC1 is detachably coupled to an opening on a side of the frame F so that the spool S can be separated or replaced, etc.

The first side cover S1 has a built-in spool cover SC2 that is used to axially support the spool shaft S2 and replace the spool S and the braking magnet M is disposed inside the spool cover S2.

Hereafter, a first embodiment in which the spool plate 10 is moved in a thread-coupling type is described with reference to FIGS. 1 to 5 and a second embodiment in which the spool plate 10 is moved in a cam-driving type is described with reference to FIGS. 6 to 13.

First, as shown in FIGS. 1 to 4, the braking adjuster includes the spool plate 10 thread-fastened to the outer side of the shaft portion S3 and moving left and right with rotation.

That is, the spool plate 10 has a pipe portion fitted on the shaft portion S3 and a first thread 11a is formed on the inner side of the pipe portion 11.

A second thread Sa to which the first thread 11a is thread-fastened is formed on the outer side of the shaft portion S3.

As the spool plate 10 thread-fastened to the shaft portion S3 is rotated in both directions, the spool plate 10 is moved left and right.

The embodiments shown in FIGS. 1 to 4 are the same in that the spool plate 10 can be moved left and right in a thread-fastening type except for the detailed method of fixing the spool plate 10 that has been moved after a braking force is adjusted.

Figure 4:
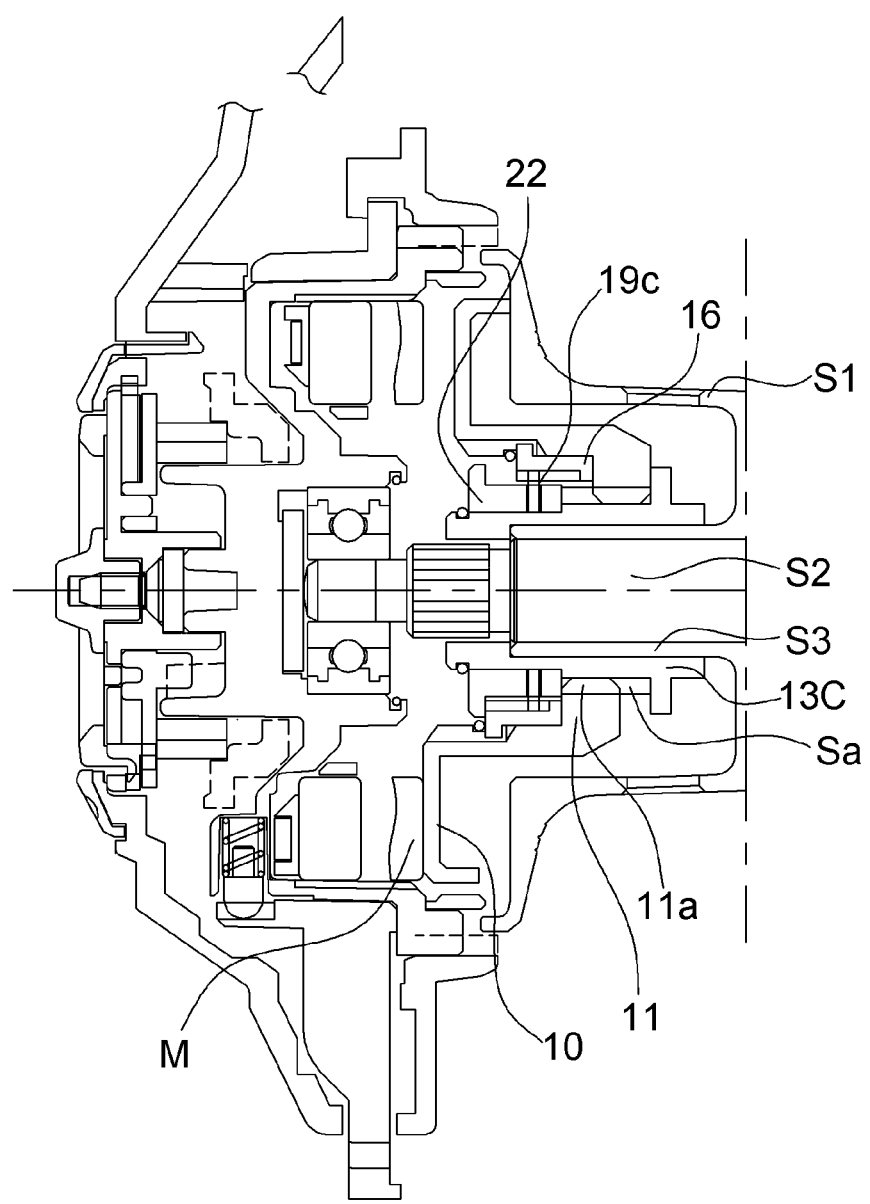

However, the embodiment shown in FIG. 4 is different in that the spool plate 10 is not directly thread-fastened to the shaft portion 3, but is fitted on the shaft portion S3 and a second thread Sa is formed on the outer side of a third spool cam 13C, thereby the first thread 11a of the spool plate 10 is thread-fastened to the second thread Sa of the third spool cam 13c.

In detail, in the embodiment shown in FIG. 1, a first spring 19a elastically supporting outward the spool plate 10 is disposed between the pipe portion 11 and the body S1 of the spool S and an O-ring 18 is fitted between the pipe portion 11 and the spool shaft S2.

Accordingly, when a user holds the spool S and rotates the spool plate 10 with a force larger than the elastic force of the first spring 19a and the friction force of the O-ring 18, the spool plate 10 is moved left and right by the thread-fastening structure. Further, when the external force is removed, the spool plate 10 is fixed at the position by the elastic force of the first spring 19a and the friction force of the O-ring 18, so the spool plate 10 is rotated with the spool S without a position change.

Figure 2:
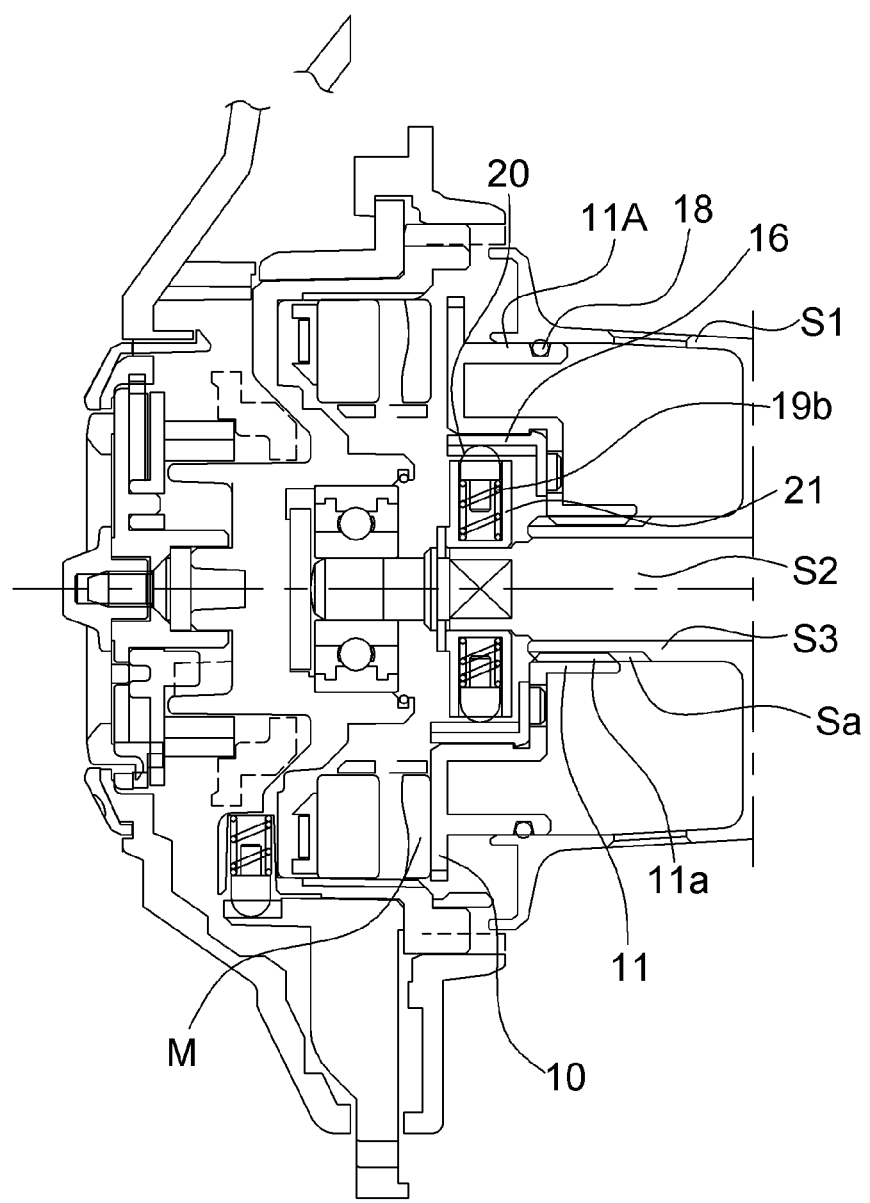

Further, in the embodiment shown in FIG. 2, the connecting portion between the spool plate 10 and the pipe portion 1 is bent in an L-shape, a plate holder 16 having a plurality of locking grooves formed circumferentially on the inner side thereof is coupled and fixed inside the connecting portion, and a holder pin 20 elastically supported outward by a second spring 19b and locked in the locking grooves is disposed between the spool shaft S2 and the plate holder 16.

Further, the O-ring 18 is fitted between the inner side of the opening of the body S1 and an outer wall 11A protruding from the inner side of the spool plate 10.

Accordingly, when a user holds the spool S and rotates the spool plate 10 with a force larger than the friction force of the O-ring 18, the second spring 19b is compressed and the holder pin 20 comes out of a locking groove, whereby the plate holder 16 is also rotated and the spool plate 10 is moved left and right by the thread-fastening structure. Further, when the external force is removed, the holder pin 20 moved out is locked into a locking groove at the position by the second spring 19b and the spool plate 10 is fixed at the position by the friction force of the O-ring 18 and thus rotated with the spool S without a position change.

Reference numeral '21' not stated above indicates a holder pin retainer 21 that is coupled and fixed to the outer side of the spool shaft S2 and that the holder pin 20 comes in and out with the second spring 19b therein.

Figure 3:
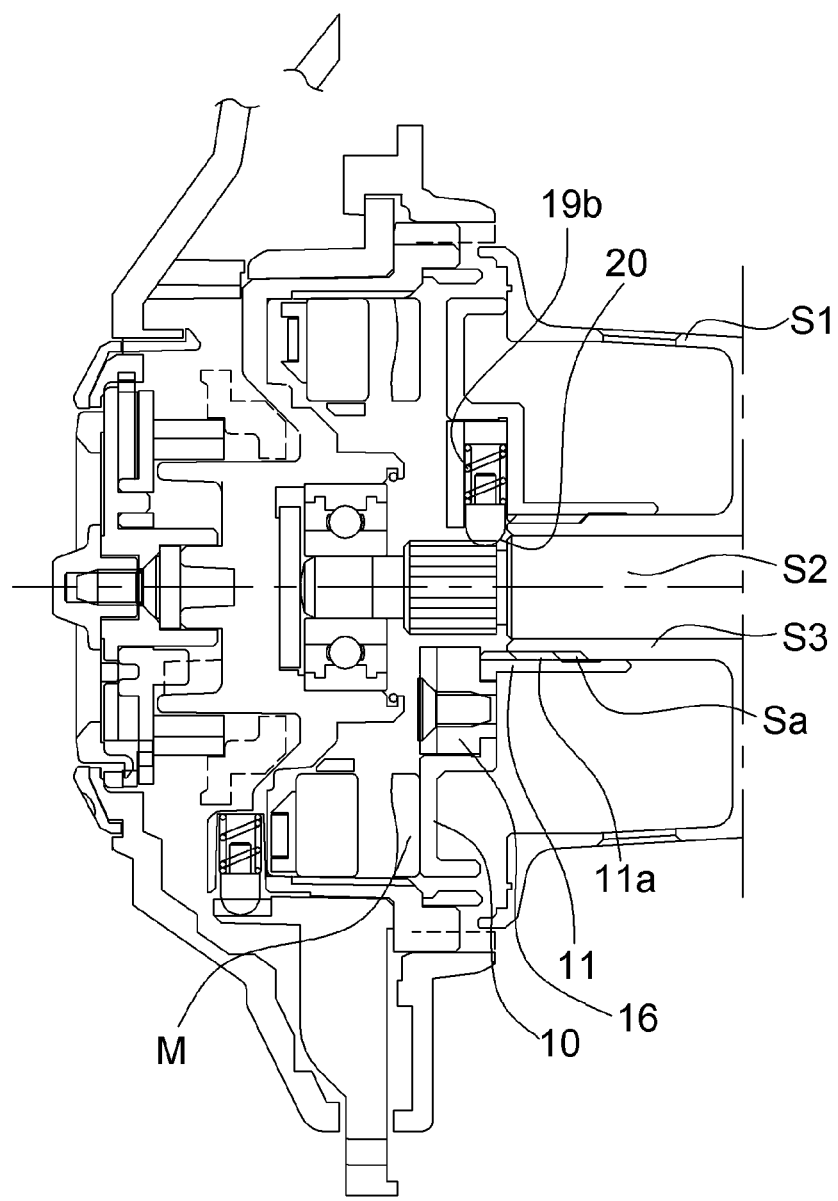

The embodiment shown in FIG. 3 is a modified example of FIG. 2, in which a plurality of locking grooves is circumferentially formed on the outer side of the spool shaft S2.

The plate holder 16 is coupled and fixed inside the L-shaped connecting portion of the spool plate 10 and the holder pin 20 elastically supported inward by the second spring 19b is mounted on the plate holder 16 to be locked in the locking grooves of the spool shaft S2.

Accordingly, when a user holds the spool S and rotates the spool plate 10, the second spring 19b is compressed and the holder pin 20 comes out of a locking groove, whereby the spool plate 10 is moved left and right by the thread-fastening structure. Further, when the external force is removed, the holder pin 20 moved out by is locked into a locking groove at the position the second spring 19b and the spool plate 10 is fixed at the position and thus rotated with the spool S without a position change.

The embodiment shown in FIG. 4 includes: a spring holder 22 coupled and fixed to the outer side of a third spool cam 13C and having an elastic member 19c elastically supported outward; and the plate holder 16 coupled and fixed inside the L-shaped connecting portion in contact with the spring holder 22 and having a plurality of locking grooves in which the elastic member 19c is locked.

Accordingly, when a user holds the spool S and rotates the spool plate 10 with a force larger than the elastic force of the elastic member 19c, the elastic member 19c moves inward and comes out of a locking groove, whereby the plate holder 16 is also rotated and the spool plate 10 is moved left and right by the thread-fastening structure. Further, when the external force is removed, the elastic member 19c is moved out and locked in a locking groove at the position, whereby the spool plate 10 is fixed at the position and rotated with the spool S without a position change.

The elastic member 19c may be a leaf spring formed in a circular shape with an opening on a side, having an elastic protrusion on the other side, and fitted in an insertion groove formed on the outer side of the spring holder 22. Alternatively, the elastic member 19c may be a ball spring having a ball member outside a coil spring and fitted in an insertion hole formed on the outer side of the spring holder 22.

Figure 5:
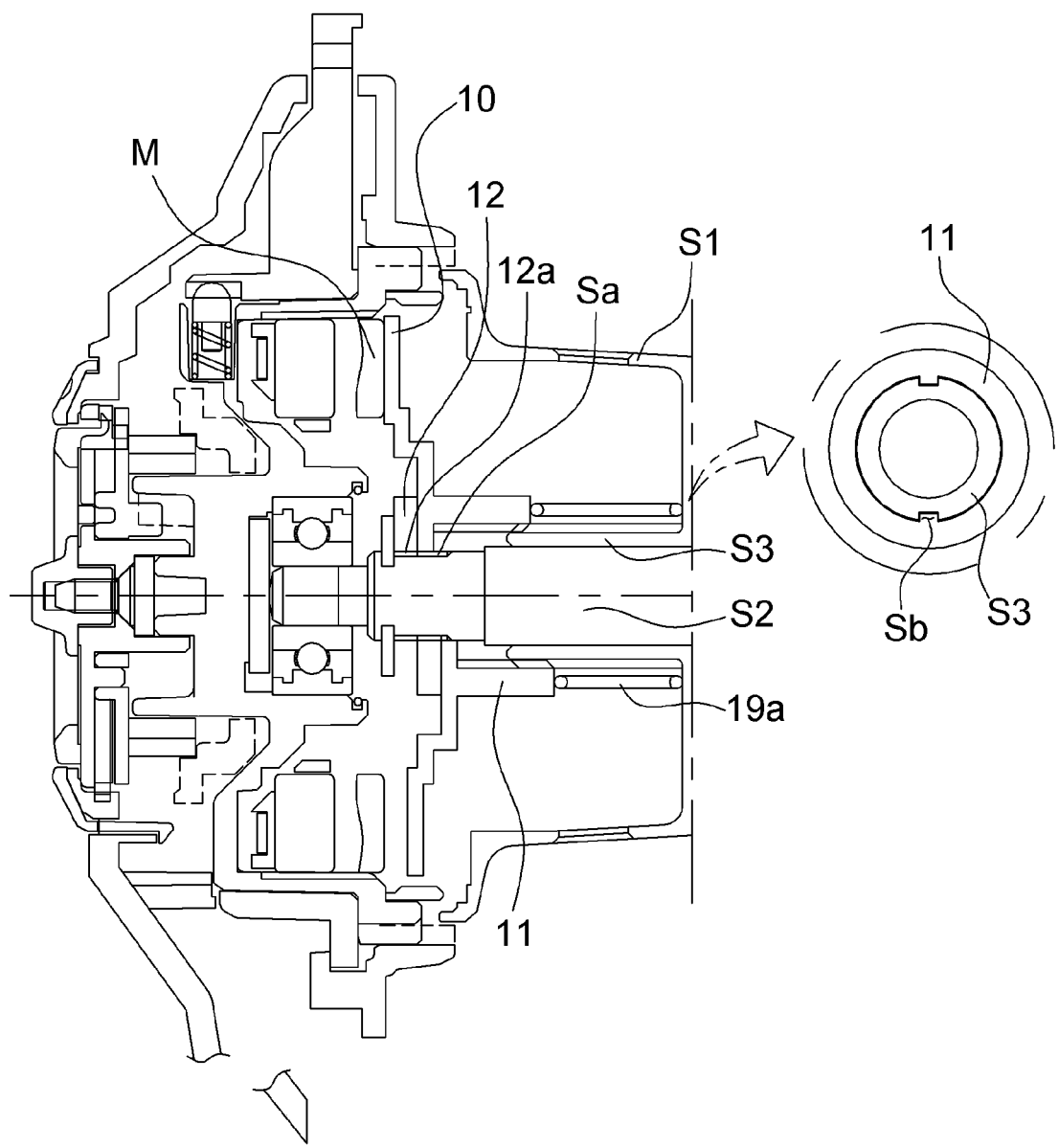

Meanwhile another modified example of a variable spool plate using a thread-fastening type is shown in FIG. 5.

The braking adjuster is characterized by including the spool plate 10 fitted on the outer side of the shaft portion S3 by sliding to move left and right, and the plate dial 12 thread-fastened to the outer side of the spool shaft S2 in contact with a side of the spool plate 10 to move left and right with rotation.

In detail, a recessed guide groove Sb is formed in a longitudinal direction on the outer side of the shaft portion S3, a protrusion that is fitted in the guide groove Sb by sliding is formed on the inner side of the pipe portion 11 of the spool plate 10, and the spool plate 10 is coupled to move only left and right with respect to the shaft portion S3 and rotate with the pipe portion 11, that is, the spool S.

The second thread Sa is formed on the outer side of the spool shaft S2 and a third thread 12a thread-fastened to the second thread Sa is formed on the inner side of the plate dial 12.

Accordingly, the spool plate 10 is fixed to rotate with the spool S in ordinary times, but when the user holds the spool S and rotates the plate dial 12, the plate dial 12 is moved left and right by the coupling structure, thereby moving the spool plate 10.

The first spring 19a elastically supporting outward the spool plate 10 is disposed between the pipe portion 11 and the body S1 of the spool S, so when the plate dial 12 is loosened, the spool plate 10 is moved outward by the first spring 19a.

A second embodiment in which the spool plate 10 is moved in a cam-driving type is described hereafter.

First, as shown in FIGS. 6 to 10, the braking adjuster includes: a first spool cam 13A coupled and fixed to the outer side of the shaft portion S3 and having a first cam portion 13a connected to have a circumferential height difference; and a first plate cam 14 connected with the spool plate 10, rotataby coupled to the shaft portion S3, having a second cam portion 14a formed in a shape corresponding to the first cam portion 13a in contact with the first cam portion 13a, and moving left and right with rotation.

That is, the second cam portion 14a is in contact with the first cam portion 13a inclined upward in a predetermined direction, so when the first plate cam 14 is rotated, the second cam portion 14a moves left and right on the slope of the first cam portion 13a, whereby the spool plate 10 is moved.

The first cam portion 13a or the second cam portion 14a may be one protrusion that is in contact with another cam portion, but the first cam portion 13a and the second cam portion 14a both may be inclined upward in a predetermined direction in surface contact with each other such that the first plate cam 14 can be uniformly supported throughout the circumferential direction.

Figure 6:
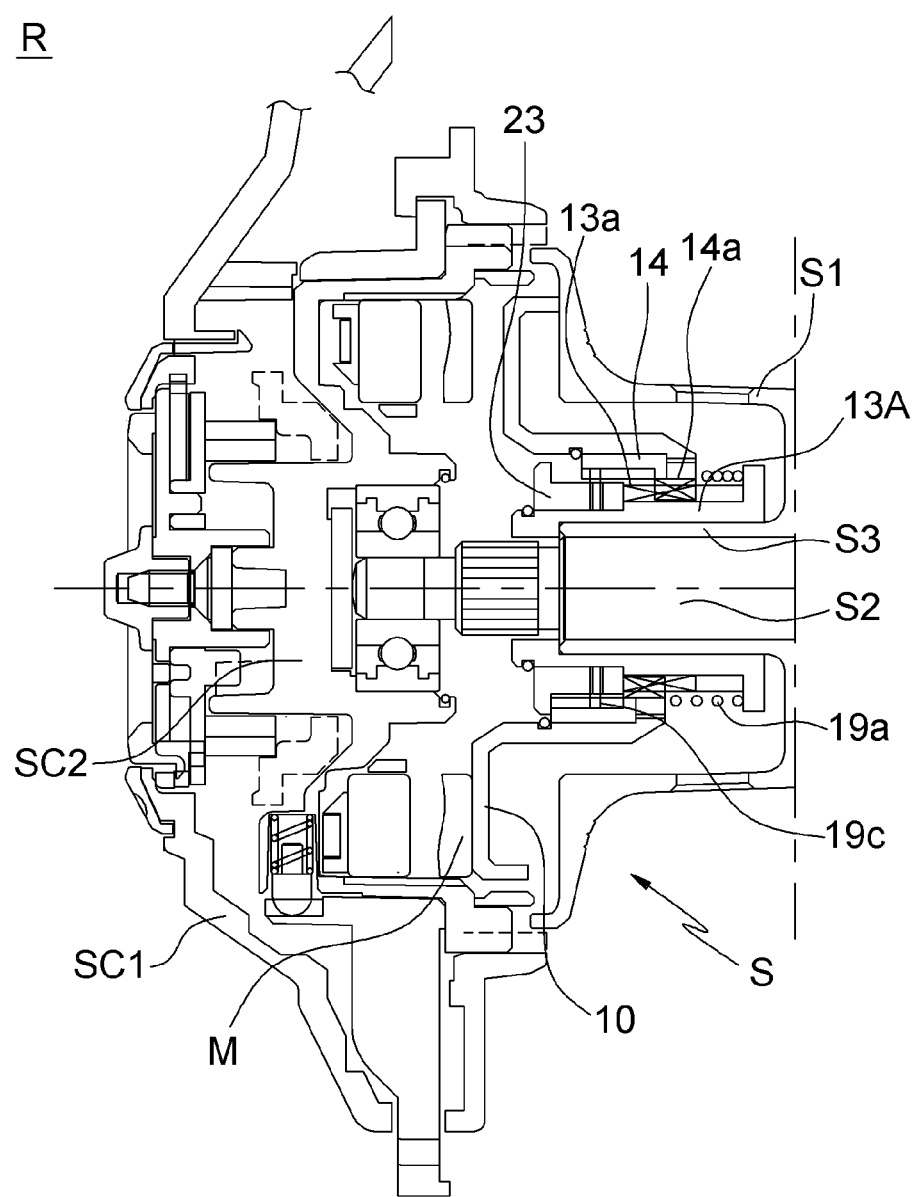
FIGS. 6 to 13 are cross-sectional views showing main parts of a second embodiment of the present invention.

In detail, in the embodiment shown in FIG. 6, the spool cam 13A having the first cam portion 13a is coupled and fixed to the pipe portion 11 by a cam holder 23.

The first plate cam 14 having the second cam portion 14a on the outer side is coupled and fixed inside the L-shaped connecting portion of the spool plate 10.

The first and second cam portions 13a and 14a are in surface contact with each other.

Further, the first spring 19a elastically supporting outward the first plate cam 14 is disposed between an inner flange of the first spool cam 13A and the first plate cam 14 and the elastic member 19c that is a leaf spring or a ball spring and is locked in the locking grooves formed on the inner side of the first plate cam 14 is disposed on the cam holder 23.

Accordingly, when a user holds the spool S and rotates the spool plate 10, the height where the first and second cam portions 13a and 14a are in contact changes, so the first plate cam 14 is moved left and right by the cam-driving type and the position of the spool plate 10 is charged. In this process, if external force is not applied to the spool plate 10, the spool plate is rotated with the spool S by the elastic force of the spring 19a and the locking structure of the elastic member 19c.

Figure 7:
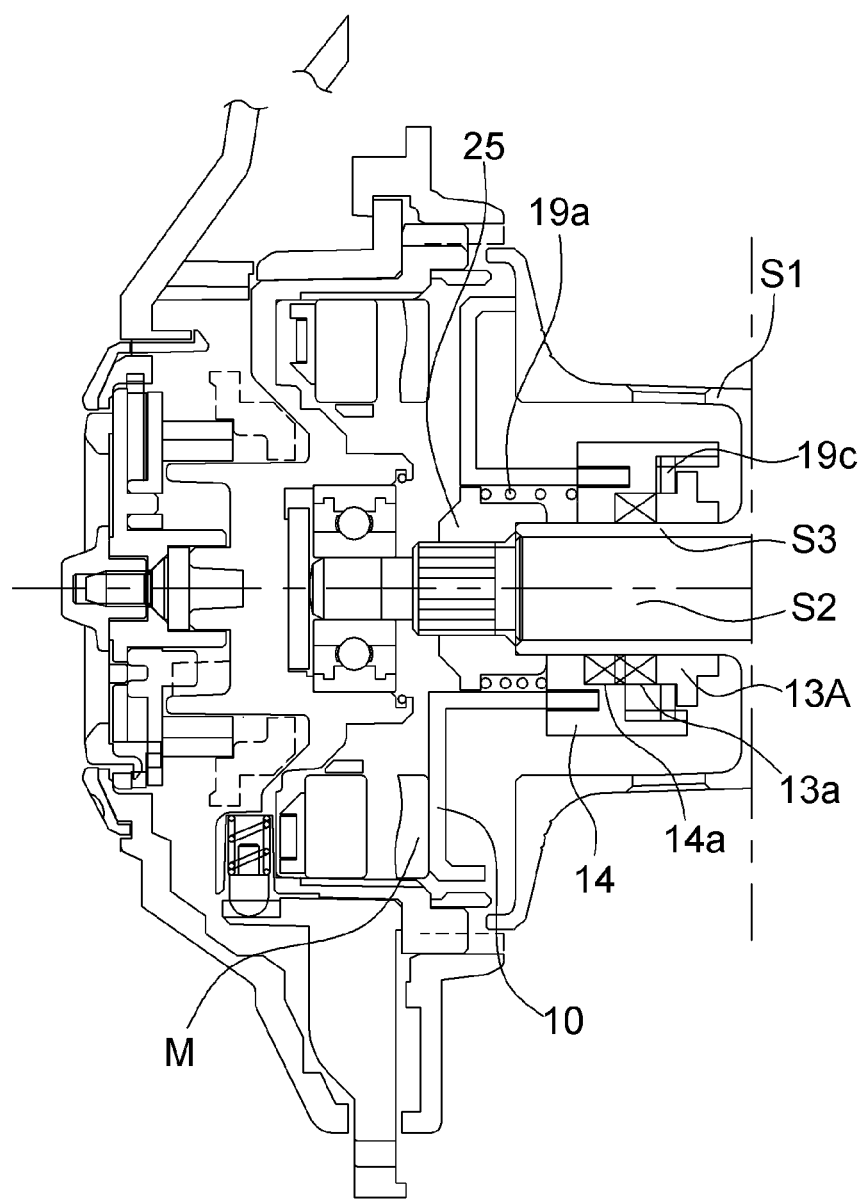

The embodiment shown in FIG. 7 is little different from the operation structure of FIG. 6. However, there is a different in that the first spring 19a is disposed between the first plate cam 14 and the cam retainer 25 fixed to the spool shaft S2 and elastically supports inward the first plate cam 14, and the elastic member 19c is disposed outside the first spool cam 13A and locked in the locking grooves formed on the outer side of the first plate cam 14.

Figure 8:
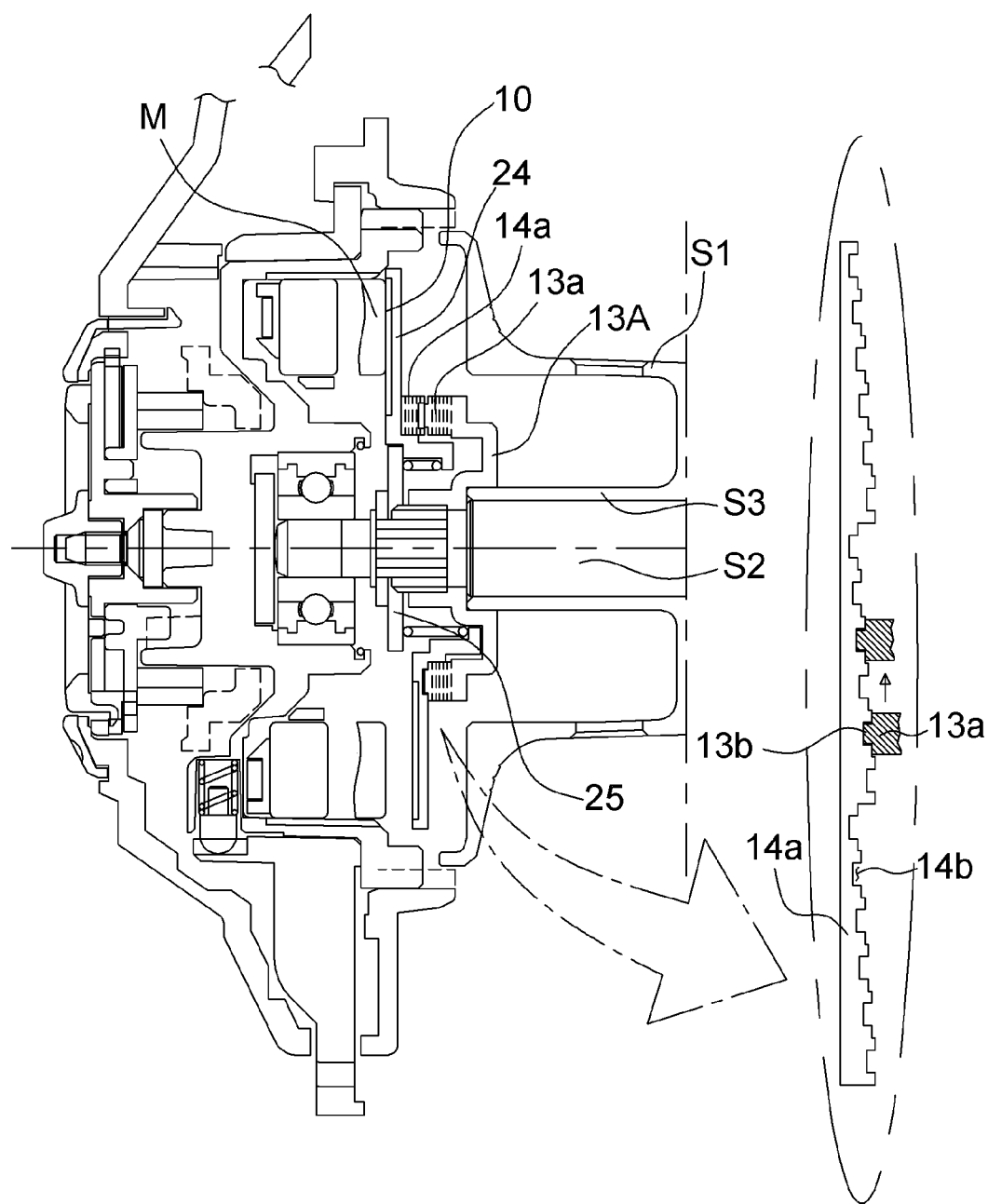
Figure 9A:
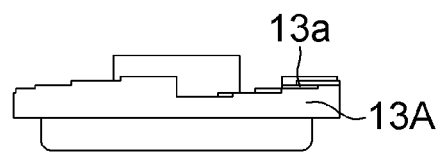
Figure 9B:
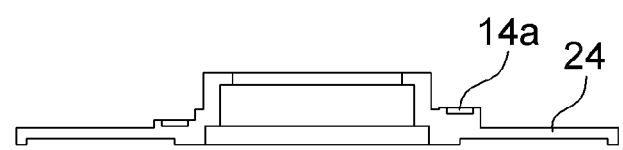
Figure 9C:
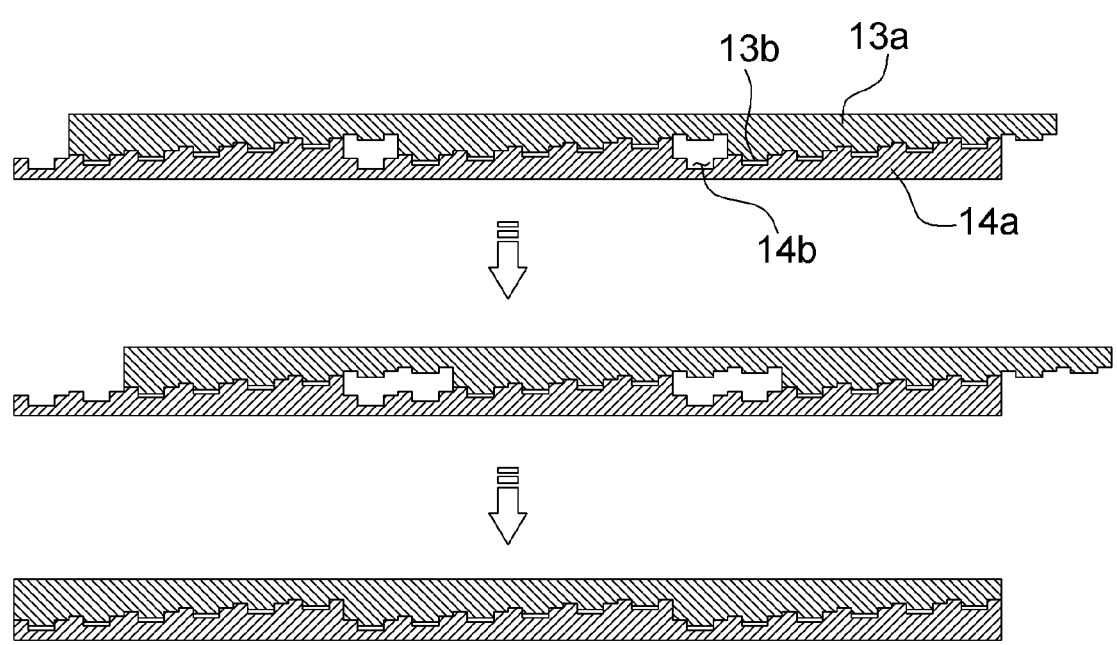
Figure 10:
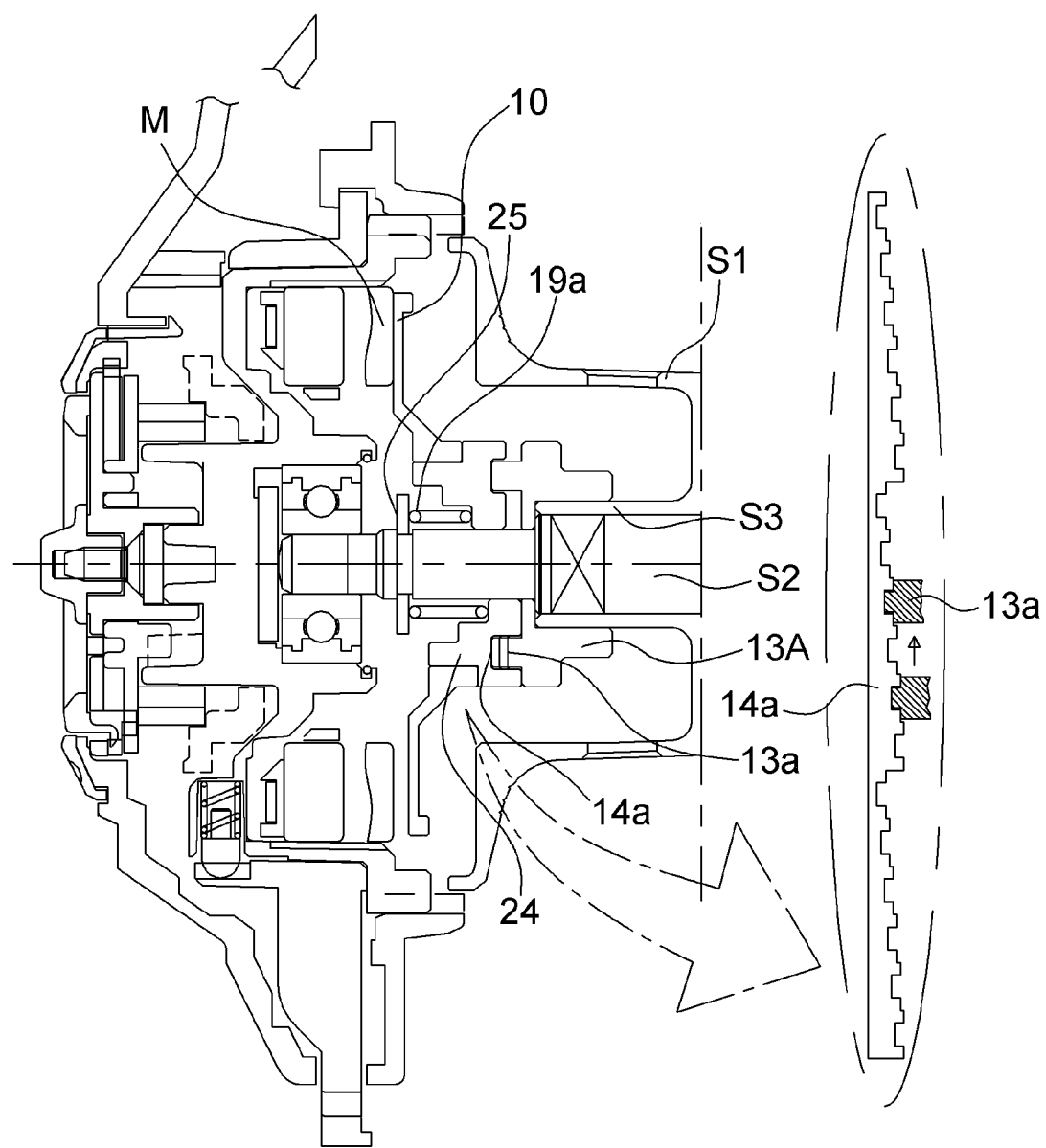

Further, as shown in FIGS. 8 to 10, the first cam portion 13a and the second cam portion 14a are characterized by formed in a step type.

That is, in the embodiments of FIGS. 6 and 7, the first and second cam portions 13a and 14a are inclined, so the left and right positions of the spool plate 10 are finely adjusted.

However, in the embodiments of FIGS. 8 to 10, the first and second cam portions 13a and 14a are formed in a step type, so the left and right positions of the spool plate 10 are adjusted step by step to each height.

Further, the embodiments shown in FIGS. 8 to 10 are characterized in that a fitting protrusion 13b and fitting groove 14b that are male-female-fitted to each other are respectively formed on the contact surfaces of the first cam portion 13a and the second cam portion 14a.

An embodiment in which the fitting protrusion 13b is formed on the first cam portion 13a and the fitting groove 14b is formed on the second cam portion 14a is representatively shown in the figures, the opposite configuration is possible.

The male-female coupling structure of the first and second cam portions 13a and 14a makes it possible to omit anti-rotation parts such as the first spring 19a, the O-ring 18, the holder pin 20, and the elastic member 19c.

In detail, in the embodiments shown in FIG. 8 and FIGS. 9A to 9C, the spool plate 10, which is a ring-shaped plate member, is disposed on a plate holder 24 coupled to be able to rotate and move left and right on the spool shaft S2 and the second cam portion 14a is disposed on the inner side of the plate holder 24.

That is, there is a difference in that the spool plate 10 and the pipe portion 11 are integrally formed in the embodiments shown in FIGS. 6 and 7, but the plate holder 24 (corresponding to the pipe portion 11) and the spool plate 10 are separately formed in the embodiments shown in FIG. 8 and FIGS. 9A to 9C. Accordingly, the plate holder 24 having the second cam portion 14a replaces the first plate cam 14.

A spring elastically supporting inward the plate holder 24 is disposed between the plate holder 24 and the cam retainer 25 coupled to an outer end of the spool shaft S2.

Accordingly, when external force is not applied to the spool plate 10, the plate holder 24 is pressed inward toward the first spool cam 13A by the spring and the male-female coupling of the first and second cam portions 13a and 14a is maintained, so the spool plate 10 is rotated with the spool S.

When a user holds and pulls the plate holder outward (toward the first side cover SC1) and then rotates it to adjust the braking force, male-female coupling of the first and second cam portions 13a and 14a is removed. Accordingly, when the user rotates the spool plate 10 and then releases the plate holder 24, the second cam portion 14a is male-female-fitted to the first cam portion 13a at another height, so the left-right position of the spool plate 10 is changed.

The embodiment shown in FIG. 10 is a similar structure to the embodiment of FIG. 8, but is different only in the shapes of the spool plate 10 and the plate holder 24.

That is, the connecting portion is formed on the plat holder 24 by the ring-shaped spool plate 10 in the embodiment of FIG. 8, but the connecting portion is formed on the spool plate 10 and fitted to the plate holder 24 in the embodiment of FIG. 10.

Figure 11:
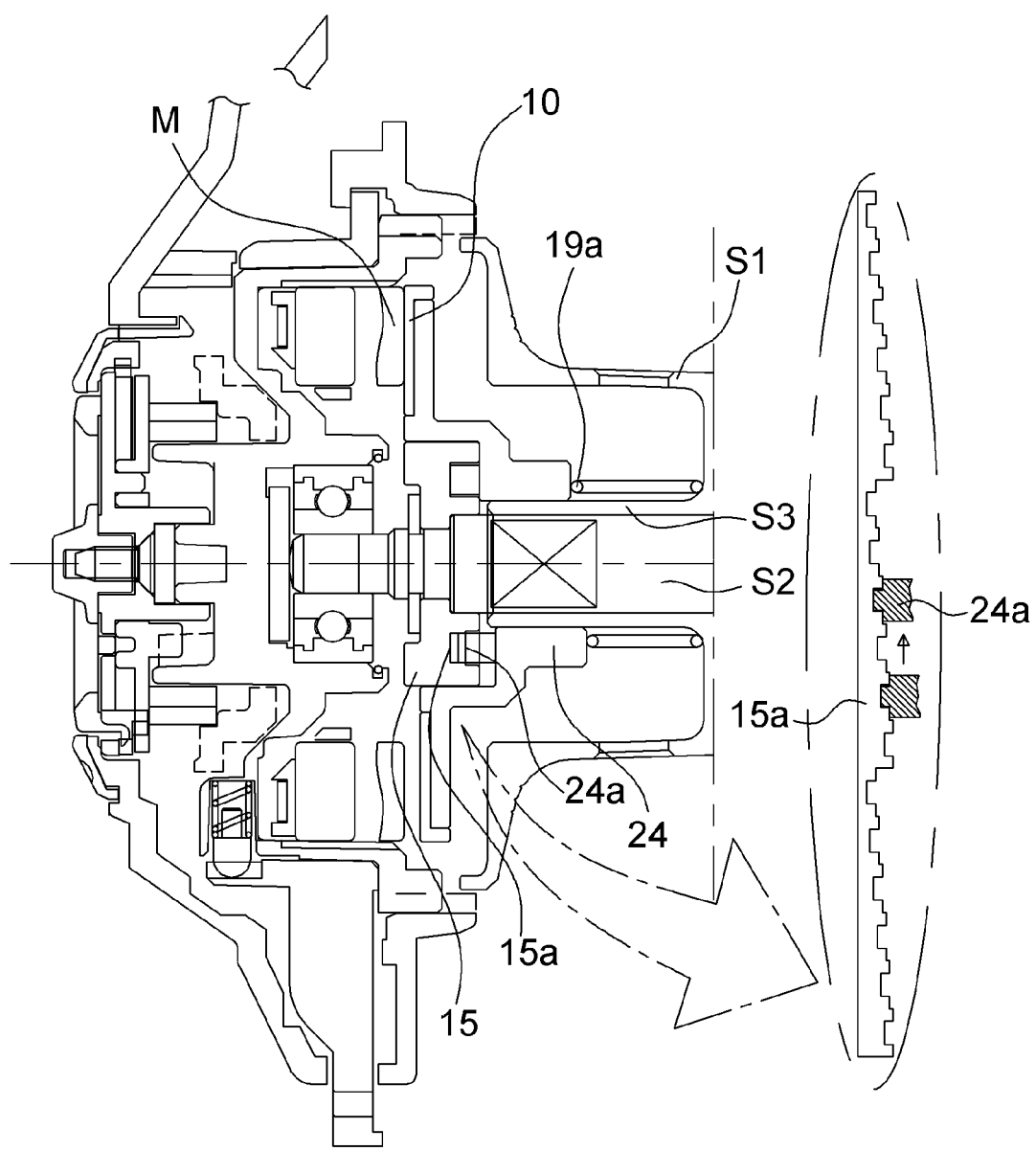
Figure 12:
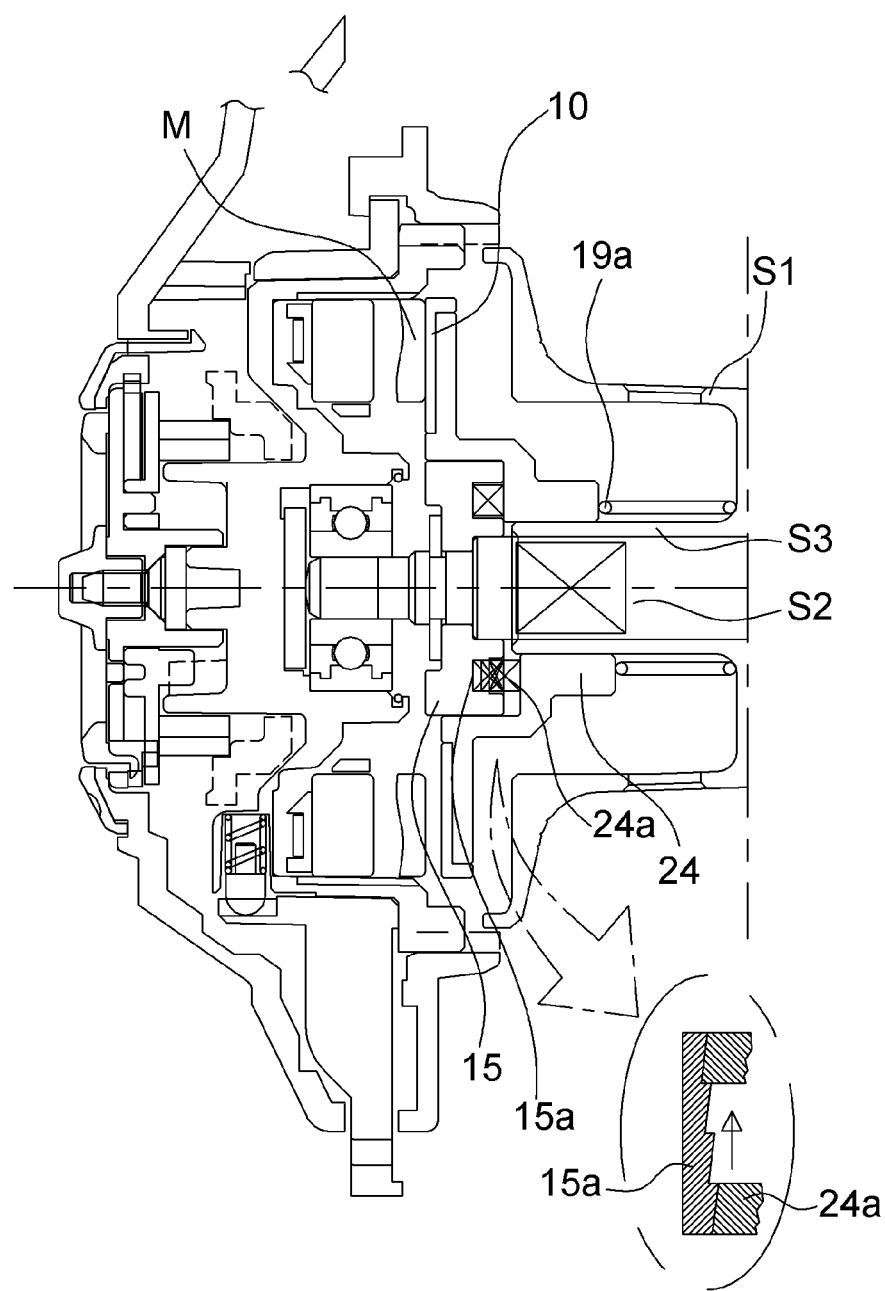

Next, as shown in FIGS. 11 and 12, the braking adjuster is characterized by including: a cam dial 15 coupled to be rotatable on the spool shaft S2 and having a third cam portion 15a connected to have a height difference in the circumferential direction; and a spool plate 10 coupled to be movable left and right on the shaft portion S3, having a fourth cam portion 24a, which has a shape corresponding to the third cam portion 15 and is in surface contact with the third cam portion 15a, and moving left and right with rotation of the cam dial 15.

An embodiment in which the plate holder 24 to which the fourth cam portion 24a is coupled to move left and right on the shaft portion S3 by the ring-shaped spool plate 10 is shown in the figures, but it may be changed in accordance with the structure or the shape of the spool plate 10.

The dam dial 15 can only rotate on the spool shaft S2 and cannot move left and right and the first spring 19a elastically supporting outward the plate holder 24 is disposed between the plate holder 24 and the body S1 of the spool S.

The third and fourth cam portions 15a and 24a respectively have the same structures as the first and second cam portions 13a and 14a, so the cam dial 15 replaces the first spool cam 13A.

Accordingly, the third and fourth cam portions 15a and 24a are male-female-coupled and the spool plate 10 is rotated with the spool S by the first spring 19a.

When a user holds the spool S and rotates the cam dial 15 with a force larger than the elastic force of the first spring 19a to adjust the braking force, the first spring 19a is compressed and the male-female coupling of the cam portions is removed, so the third cam portion 15a is rotated. When the third cam portion 15a finishes being rotated, the contact height of the fourth cam portion 24a is changed, so the left-right position of the spool plate 10 is changed.

The third and fourth cam portions 15a and 24a are formed in a horizontal step type in which the contact surfaces of the cam portions are horizontal surfaces, and a fitting groove 14b and a fitting protrusion 13b are formed at each height in the embodiment shown in FIG. 11, but, in the embodiment shown in FIG. 12, third and fourth cam portions 15a and 24a are formed in a saw tooth step type in which the contact surfaces of the cam portions are inclined surfaces, so the spool plate 10 can be rotated with the spool S even without the fitting protrusion 13b and the fitting groove 14b.

Figure 13:
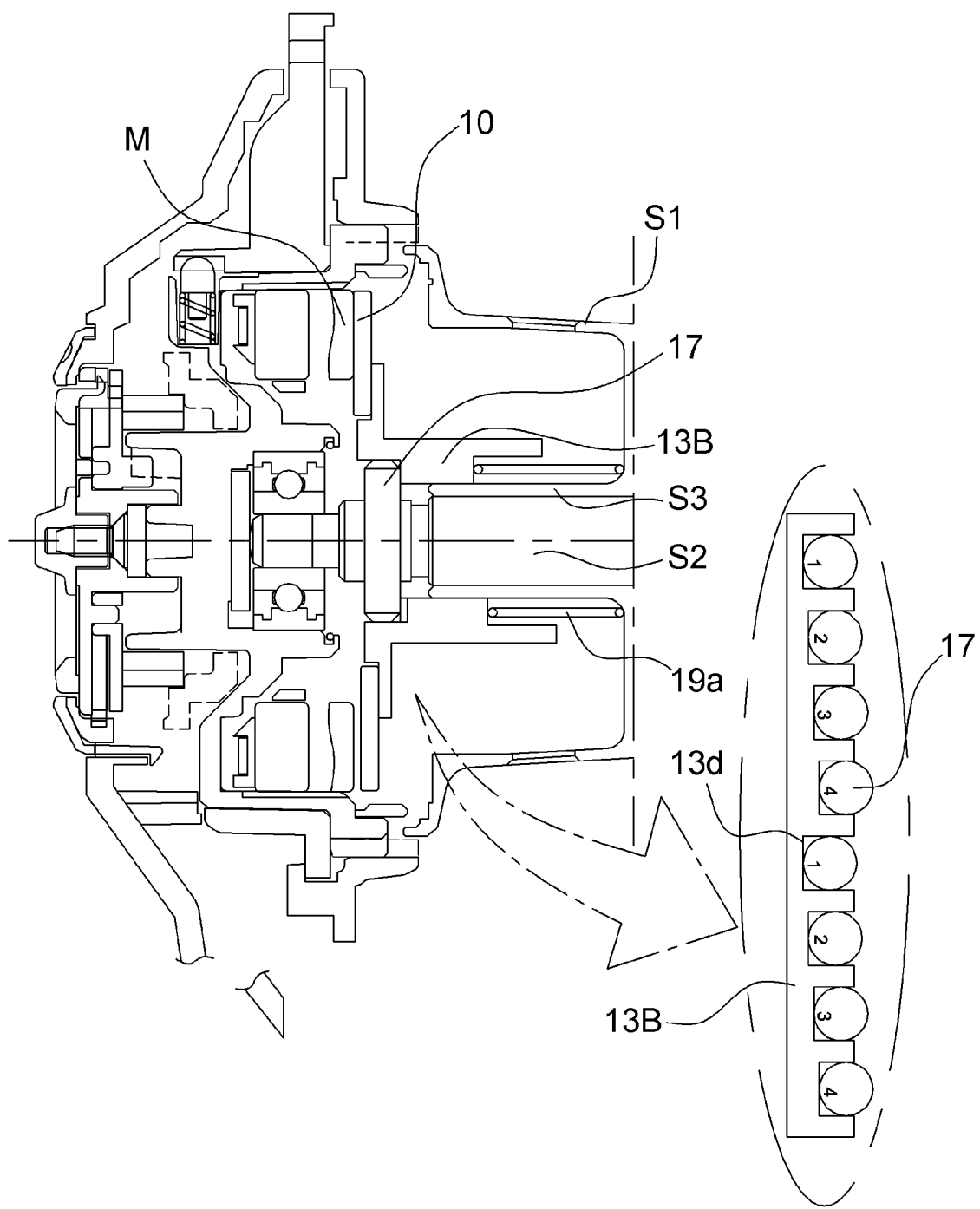

Next, as shown in FIG. 13, the braking adjuster is characterized by including: a stopper pin 17 coupled through the spool shaft S2 in the front-rear direction; and a second spool cam 13B connected with the spool plate 10, coupled to be able to rotate and move left and right on the shaft portion S3, having a height difference in the circumferential direction, having slots 13d, in which both ends of the stopper pin 17 are fitted, and moving left and right with rotation.

The second spool cam 13B is elastically supported outward by a first spring 19a fitted on the shaft portion S3.

The topper pin 17 is disposed through the spool shaft S2 with both ends protruding outward from the spool shaft S2 and the second spool cam 13B has the slot 13d circumferentially formed on the inner side of a receiving portion having an opening on a side, so both ends of the stopper pin 17 are fitted and locked in the slot 13d at the same height with the stopper pin 17 received in the receiving portion.

In this state, the spool plate 10 is rotated with the spool S.

When a user presses the spool plate 10 inward toward the spools to adjust the braking force, the stopper pin 17 is separated out of the receiving portion. Further, in this state, when the user rotates and then releases the spool plate 10, the second spool cam 13B is returned by the first spring 19a and the stopper pin 17 is fitted in a slot 13d at another height, whereby the left-right position of the spool plate 10 is changed.

According to the present invention having the configurations described above, a user can adjust the position for the optimum maximum braking force to fit to himself/herself by practicing casting while moving the spool plate 10 not to come in contact with the magnet M in the thread-fastening type or the cam-driving time after moving the spool plate 10 and the magnet M in contact with each other or closest to each other by moving the spool plate 10 to the outermost side when he/she initially purchases the product.

Further, when the maximum braking force is not operated well due to wear, deformation, etc. of parts in use, it is possible to adjust again the position for the maximum braking force by moving again the spool plate 10 to come in contact with the magnet M and then performing zero adjustment.

Further, although a bait casting reel having a variable spool plate was described with reference to the accompanying drawings, the present invention may be changed, modified, and replaced in various ways by those skilled in the art, and the change, modification, and replacement should be construed as being included in the protective range of the present invention.

What is claimed is:

1. A bait casting reel comprising:
a spool disposed on a reel body with a shaft therethrough and having a body on which a fishing line is wound and which has an opening on a side, and a shaft portion that protrudes to a side from the opening of the body and in which a spool shaft is fitted;
a variable spool plate disposed to be able to move left and right in the opening of the body in a longitudinal direction of the shaft portion;
a braking magnet disposed inside a spool cover of the reel body and providing a braking force for reducing a rotational speed of the spool using a magnetic force that is applied to the variable spool plate; and a braking force adjuster coupling the variable spool plate such that the variable spool plate can move left and right on the shaft portion, and adjusting the braking force of the braking magnet by adjusting a distance between the variable spool plate and the braking magnet, wherein the braking adjuster includes:

a first spool cam coupled and fixed to an outer side of the shaft portion and having a first cam portion connected to have a circumferential height difference; and a first plate cam connected with the variable spool plate, rotataby coupled to the shaft portion, having a second cam portion formed in a shape corresponding to the first cam portion in contact with the first cam portion, and moving left and right with rotation, wherein the first cam portion and the second cam portion are connected in step type, wherein the first cam portion and the second cam portion respectively have a fitting groove and a fitting protrusion that are male-female coupled on contact surfaces, and wherein when the variable spool plate is moved to an outermost side, the variable spool plate and the braking magnet come in contact with each other or move closest to each other, so a user can perform zero adjustment such that the variable spool plate and the braking magnet are minimally spaced in order to set a maximum braking force of the braking magnet.

2. A bait casting reel comprising:

a spool disposed on a reel body with a shaft therethrough and having a body on which a fishing line is wound and which has an opening on a side, and a shaft portion that protrudes to a side from the opening of the body and in which a spool shaft is fitted;

a variable spool plate disposed to be able to move left and right in the opening of the body in a longitudinal direction of the shaft portion;

a braking magnet disposed inside a spool cover of the reel body and providing a braking force for reducing a rotational speed of the spool using a magnetic force that is applied to the variable spool plate; and a braking force adjuster coupling the variable spool plate such that the variable spool plate can move left and right on the shaft portion, and adjusting the braking force of the braking magnet by adjusting a distance between the variable spool plate and the braking magnet, wherein the braking adjuster includes:

a stopper pin coupled through the spool shaft in a front-rear direction; and a second spool cam connected with the variable spool plate, coupled to be able to rotate and move left and right on the shaft portion, having a height difference in a circumferential direction, having slots, in which both ends of the stopper pin are fitted, and moving left and right with rotation, and wherein when the variable spool plate is moved to an outermost side, the variable spool plate and the braking magnet come in contact with each other or move closest to each other, so a user can perform zero adjustment such that the variable spool plate and the braking magnet are minimally spaced in order to set a maximum braking force of the braking magnet.

* * * * *